United States Patent [19]

Boltjes

[11] Patent Number: 5,524,010
[45] Date of Patent: Jun. 4, 1996

[54] COMMUNICATION SYSTEM, NETWORK TERMINAL UNIT TO BE USED IN A COMMUNICATION SYSTEM AND TERMINAL TO BE CONNECTED TO A COMMUNICATION SYSTEM

[75] Inventor: Coendert J. Boltjes, Amersfoort, Netherlands

[73] Assignee: U.S. Philips Corporation, New York, N.Y.

[21] Appl. No.: 359,374

[22] Filed: Dec. 20, 1994

[30] Foreign Application Priority Data

Dec. 23, 1993 [BE] Belgium .................. 09301445

[51] Int. Cl.$^6$ .................................................. H04J 3/12
[52] U.S. Cl. ................... 370/110.1; 370/58.2; 370/85.1
[58] Field of Search ..................... 370/110.1, 85.1, 370/100.1, 102, 105.2, 94.1, 94.3, 60, 58.1, 58.2, 56, 68.1, 60.1; 340/825.03, 825.04, 825.05

[56] References Cited

U.S. PATENT DOCUMENTS

| | | | |
|---|---|---|---|
| 4,722,082 | 1/1988 | Furuya et al. | 370/85 |
| 4,835,769 | 5/1989 | Donaghue, Jr. et al. | 370/85 |
| 4,891,813 | 1/1990 | Salcedo et al. | 371/37.1 |
| 4,999,386 | 3/1991 | Fujiwara | 370/110.1 |
| 5,185,741 | 2/1993 | Iguchi et al. | 370/110.1 |
| 5,375,117 | 12/1994 | Morita et al. | 370/110.1 |
| 5,410,539 | 4/1995 | Ikeno | 370/110.1 |
| 5,457,693 | 10/1995 | Sasaki | 370/110.1 |

FOREIGN PATENT DOCUMENTS 2079698  3/1990  Japan .................. H04Q 5/00

OTHER PUBLICATIONS

CCITT Recommendation I.430.
CCITT Recommendation Q.921.

Primary Examiner—Hassan Kizou
Assistant Examiner—Seema S. Rao
Attorney, Agent, or Firm—Michael J. Balconi-Lamica; Anne E. Barschall

[57] ABSTRACT

A communication system (1) operating according to the ISDN standard comprises a network terminal unit (2) to which ISDN terminals (TE1 ... TEn) can be connected via a bus (4). The network terminal unit (2) and the terminals (TE1 ... TEn) communicate with each other over an ISDN S-interface ($S_0$). The network terminal unit (2) itself provides setting up a local communication between two terminals (TE1, TE2) connected to the bus (4). As a result, further elements in the communication system (1), such as the central control unit (3), are not loaded with this. If a local communication is to be set up, the calling terminal (TE1) is to insert an indicator (LC) in the first message (SET UP) to be sent, on the basis of which indicator the routing means set up transparently the local communication to a called terminal (TE2) connected to the bus (4). All further messages (msg) sent via the D-channel between the calling terminal (TE1) and a called terminal (TE2) are rerouted to the bus (4) via the D-channel, because they have a call reference (call ref) which is the same as the call reference (call ref) in the SET UP message (SET UP). As a result, the network terminal unit (2) knows that these messages (msg) belong to the local communication. The two terminals (TE1, TE2) can send these messages in the same manner as in a standard ISDN communication system.

5 Claims, 4 Drawing Sheets

COMMUNICATION SYSTEM, NETWORK TERMINAL UNIT TO BE USED IN A COMMUNICATION SYSTEM AND TERMINAL TO BE CONNECTED TO A COMMUNICATION SYSTEM

BACKGROUND OF THE INVENTION

1. Field of the Invention

The invention relates to a communication system, comprising a network terminal unit coupled via an interface to a bus for connecting terminals to the communication system, the network terminal unit comprising routing means for setting up a local communication between at least two terminals which can be connected to the bus, in response to a first message to be sent over the bus. Furthermore, the invention relates to a network terminal unit to be used in a communication system and also to a terminal to be connected to a communication system. Such a communication system is, for example, a private branch exchange or a subscriber connection to a public integrated services digital network ISDN.

2. Discussion of the Related Art

A communication system as defined in the opening paragraph is known from Japanese Patent Application laid open to public inspection under number 2-79698. In the communication system described there the network terminal unit sets up the local communication between the two terminals if the first message sent by the first terminal and called SET UP message in ISDN contains a telephone number of the second terminal. To ascertain this, the network terminal unit is to comprise a memory containing telephone numbers of all the terminals connected to the bus. The contents of this memory are different for each network terminal unit, because each network terminal unit in a communication system is connected to different terminals which have different telephone numbers. As a result, each network terminal unit is to be programmed in dependence on the terminals connected to the bus, which is undesirable from the point of view of efficiency.

SUMMARY OF THE INVENTION

It is an object of the invention to provide a communication system as defined in the opening paragraph, which does not have this drawback.

For this purpose a communication system as defined in the opening paragraph is characterized in that, for setting up the local communication, a calling terminal which can be connected to the bus inserts a bus-specific indicator in the first message on the basis of which indicator the routing means set up the local communication transparently to a called terminal that can be connected to the bus. In a communication system according to the invention all the network terminal units can be structured the same. This means that an ISDN communication system according to the invention needs few adaptations with respect to a standard ISDN communication system. Since a communication between two terminals connected to the same bus is set up by the network terminal unit, if the communication system is a private branch exchange, other system components in the private branch exchange are not loaded with this communication. If the communication system is a subscriber terminal, the exchanges in the public ISDN network are not loaded with the communication. If the first terminal does not insert the indicator indicating that a local communication is to be set up in the first message (SET UP message), the routing means transfer the SET UP message to other system components or to an exchange in the public ISDN network. No local communication is set up in that case.

An embodiment for a communication system according to the invention is characterized in that the routing means direct the first message to a control channel on the bus. The routing means can, prior to routing the SET UP message to the control channel, remove the indicator from the SET UP message which indicator indicates that the local communication is to be set up. The SET UP message is received by the called terminal. For the called terminal there is no difference between receiving a SET UP message which does belong to a local communication and a SET UP message that does not belong to a local communication. The called terminal does not even have to be informed of a local communication taking place. As a result, there is no need for adapting the called terminal with respect to a standard ISDN terminal to receive the SET UP message.

A further embodiment for a communication system according to the invention is characterized in that the routing means reroute messages which are received through the control channel on the bus and which have a call reference equal to a call reference in the first message to the control channel on the bus. Every SET UP message has a unique call reference for the communication to be set up. The terminals give other messages belonging to the communication the same call reference as the SET UP message. Consequently, the two terminals can, if local communication is concerned, send and receive these messages in the same manner as when no local communication is concerned. This means that for sending and receiving messages other than the SET UP message which belongs to a local communication, the terminals need not be adapted with respect to standard ISDN terminals.

BRIEF DESCRIPTION OF THE DRAWINGS

The invention will be further explained with reference to a drawing, in which.

DETAILED DESCRIPTION OF THE PREFERRED EMBODIMENTS

Figure 1:
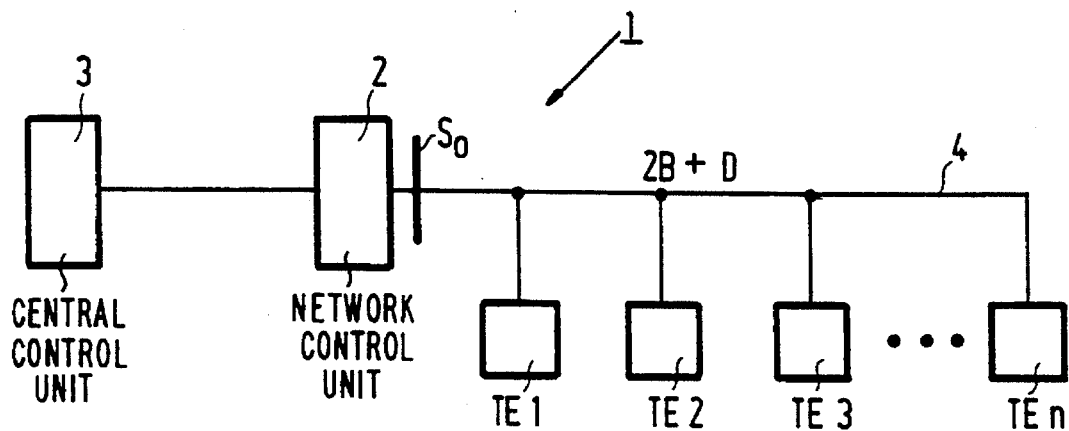
FIG. 1 shows a diagram of a communication system according to the invention.
Figure 2:
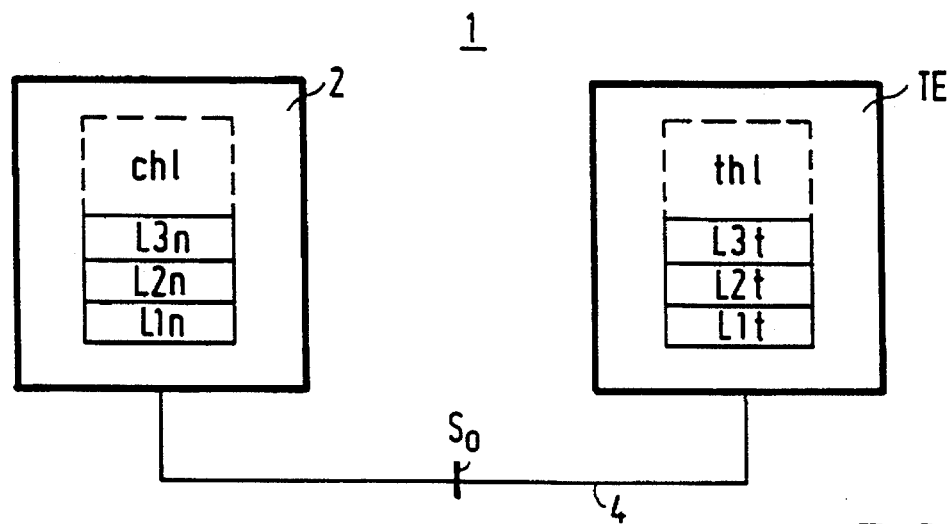
FIG. 2 shows communication between a communication system and a terminal via an $S_0$ interface in terms of an OSI-layer model.

FIG. 1 shows in a diagram a communication system 1 according to the invention which works on the basis of an Integrated Services Digital Network ISDN. The communication system comprises a network terminal unit 2 and a central control unit 3. The communication system 1 is coupled to a bus 4 via a so-called $S_O$-interface. The $S_0$-interface is here a Basic User Network interface in a point to multipoint configuration. It is possible according to CCITT Recommendations to connect a maximum of 8 ISDN-supported terminals TE1 . . . TEn, where n=8 to the bus 4. The communication between the terminals TE1 . . . TEn and the communication system is effected in both directions by means of an ISDN Basic User Network Interface 2B+D-channel structure through which combined speech and data communication may take place in various ways. The transmission rate on layer 1 of the $S_O$-interface is 144 kbit/s, 2×64 kbit/s for the 2 B-channels and 16 kbit/s for the D-channel. The ISDN B-channels, for which ISDN makes available only ISDN-layer 1 functions, are intended to carry speech data and other dam, whereas the ISDN D-channel, the control channel, may be used not only for signalling purposes but also for transferring information. For the D-channel ISDN renders available ISDN-layer 1, layer 2 and layer 3 functions. Layer 1 is the physical layer, layer 2 is the data link layer and layer 3 is the network layer. Layer 1 is described in CCITT Recommendation I.430, layer 2 in CCITT Recommendation Q.921 and layer 3 in CCITT Recommendation Q.931. How the communication Wa the D-channel between a terminal and an ISDN network terminal unit is effected in terms of the OSI-layer model (Open Systems Interconnection) is represented in FIG. 2. On the side of the terminal the layers L1t, L2t and L3t are shown and on the side of the network terminal unit the layers L1n, L2n and L3n, which represent the bottom three layers of an ISDN protocol. Over the first three layers in the terminal is shown in a dotted line the terminal handling th1. This indicates that the OSI layers 4 to 7 can support in-house features in the ISDN terminal. On the side of the terminal, the OSI layers 4 to 7 are not prescribed for the ISDN D-channel and may thus be filled in without constraints on the side of the network terminal unit. This is shown in a dotted line as call handling chl. Under given circumstances the call handling can also be effected in the central control unit 3.

Figure 3:
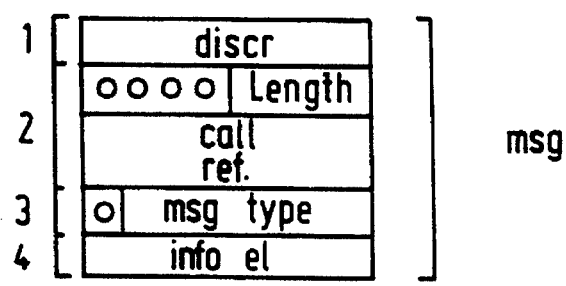
FIG. 3 shows how network layer messages are built up.

FIG. 3 shows how a network layer message msg (layer 3 message) is structured according to CCITT Recommendation Q.931. The first field contains the protocol discriminator discr indicating which protocol is used. The second field contains the call reference CALL REF consisting of a minimum of 2 bytes. The call reference indicates which communication the message belongs to. The first byte length indicates the length of the call reference. Since the 4 most significant bits are always 0, the maximum length of the call reference is 15 bytes. The third field of the message is always intended to specify the type of message msg type. Examples of types of messages are the SET UP message SET UP and other signalling messages such as ALERT and CONNECT. These types of messages and also other types of messages are stated with their connotations in CCITT Recommendation Q.931, Geneva 1989, page 16. The rest of the message is taken up by information elements info el. There are information elements having a fixed length of 1 byte and there are information elements having a variable length of several bytes. For the structure of an information element reference be made to CCITT Recommendation Q.931, Geneva 1989, page 73. Each information element contains an identification code indicating what type of information element it is. Some information elements contain not only the identification code, but still more bytes which contain information. Other information elements contain only the identification code. A number of information elements are defined by Recommendation Q.931, Geneva 1989, page 74. Examples of defined information elements are "originating address", which indicates which terminal has sent the message, "destination address", which indicates which terminal is to receive the message and "user-user information" in which the users can transfer information by the D-channel. Recommendation Q.931, however, leaves furthermore room for defining further information elements. In a communication system according to the invention an additional information element LC is defined to be used as an indicator indicating that a local communication between two terminals on the same $S_0$ bus is desired. This information element is also shown in FIG. 3.

Figure 4:
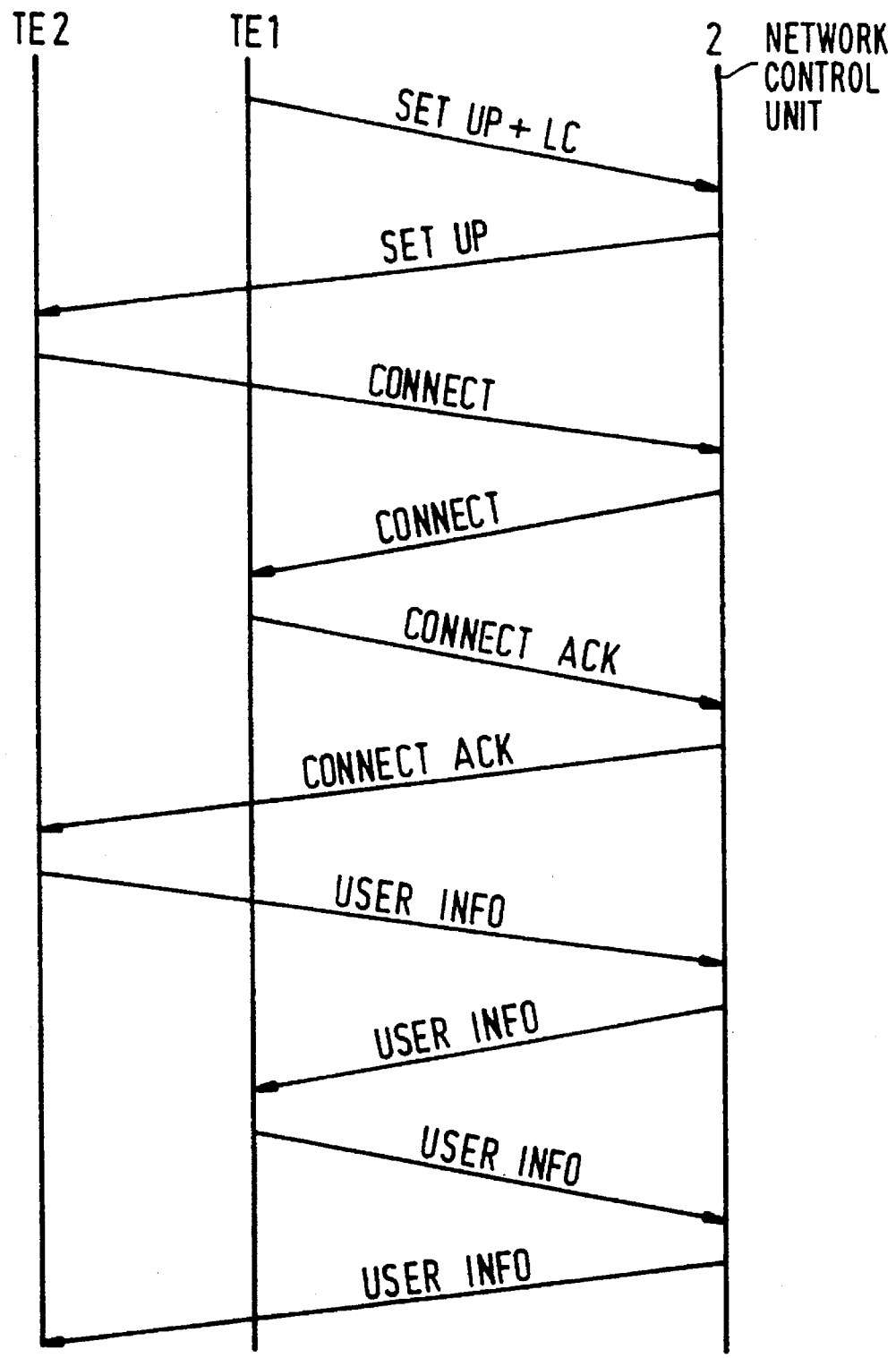
FIG. 4 shows network layer messages in a communication system according to the invention.

FIG. 4 shows network layer messages in a communication system according to the invention. There is shown how, in the case of a local communication, the messages are routed between a calling terminal TE1, the network terminal unit 2 and a called terminal TE2, while the terminals are connected to the same bus. The calling terminal TE1 sends over the D-channel a SET UP message SET UP which contains the indicator LC. Due to the addition of this information element the network terminal unit 2 notices that a local communication is to be set up. For this purpose, the SET UP message SET UP is sent over the D-channel to the called terminal TE2 while standard ISDN procedures are utilized. The indicator LC can be removed from the SET UP message SET UP. In response to the SET UP message the called terminal may transmit, for example, a CONNECT message to indicate that a communication has been established. As this CONNECT message has the same call reference as the SET UP message, the CONNECT message is sent to the calling terminal TE1 by the network terminal unit 2. This terminal TE1 responds to this by giving an acknowledge message CONNECT ACK which is sent to the called terminal TE2 by the network terminal unit 2 because the acknowledge message has the same call reference as the SET UP message. It is already possible to exchange information between the users by inserting user-user information elements in the messages SET UP, CONNECT and CONNECT ACK. Once the CONNECT ACK message has been received by the called terminal TE2, the terminals can exchange USER INFORMATION messages. In Recommendation Q.931, Geneva 1989, this manner of exchanging information is described on page 210. The USER INFORMATION messages are locally routed by the network terminal unit 2 because they have the same call reference as the SET UP message.

Figure 5:
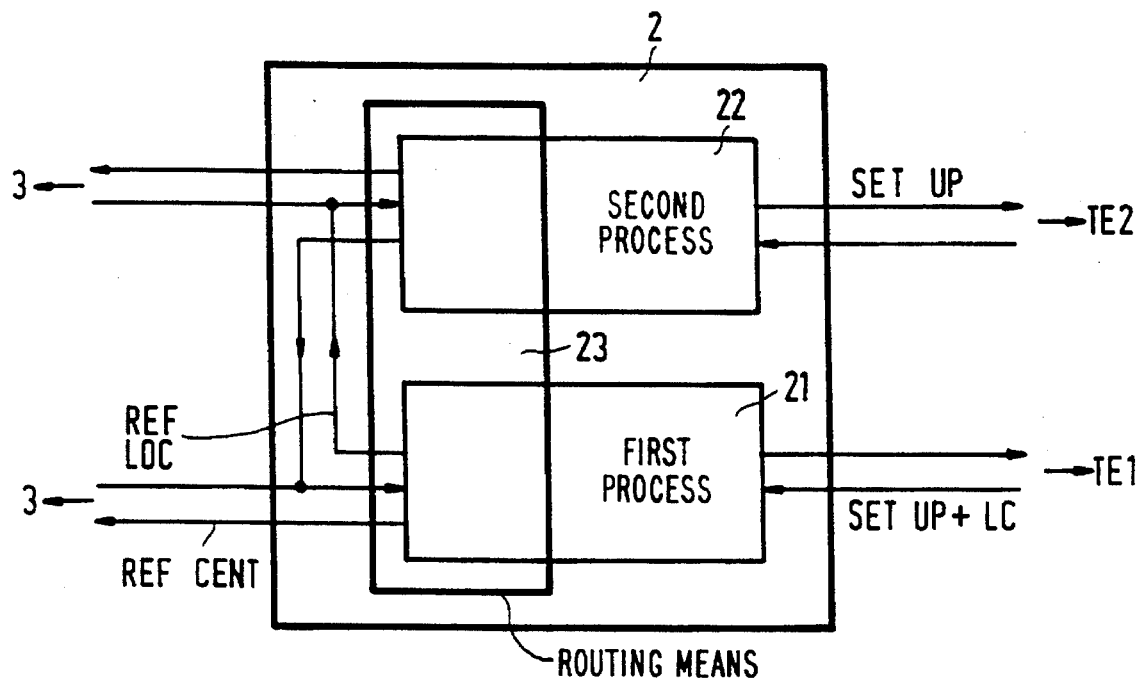
FIG. 5 shows processes in a network terminal unit according to the invention.

FIG. 5 shows processes in a network terminal unit 2 according to the invention. When a SET UP message sent by the calling terminal TE1 is received from the bus by the network terminal unit, a first process 21 is initiated. In this process 21, routing means 23 verify whether the SET UP message contains the indicator LC. If the indicator is present, the routing means insert a local reference REF LOC. This results in the start of a second process 22 to which the SET UP message is routed. The SET UP message is processed then in the same way as a SET UP message sent from the central control unit to the network terminal unit. Subsequently, the SET UP message is sent to the bus after which it may be received and processed in standard ISDN mode by the called terminal TE2. The two processes 21 and 22 are logically connected by the reference REF LOC, so that all the messages belonging to the local communication are routed between the two processes 21, 22. If a SET UP message does not contain an indicator LC, the routing means insert a reference REF CENT, so that the SET UP message is transferred to the central control unit 3 which handles the communication to be set up. Further messages in such a non-local communication are also transferred to the central control unit.

Figure 6:
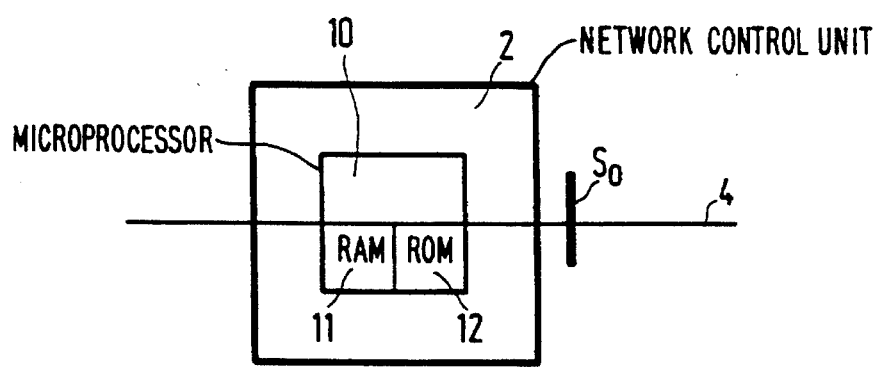
FIG. 6 shows the hardware located at the network terminal unit.

FIG. 6 shows by way of example the hardware contained in the network terminal unit. The network terminal unit 2 contains a microprocessor 10 which has a RAM memory 11 and a ROM memory 12. The ROM memory contains control software for the network terminal unit. This control software contains the routing means 23. The microprocessor 10 handles the incoming layer-3 messages in the manner described with reference to FIG. 5.

Figure 7:
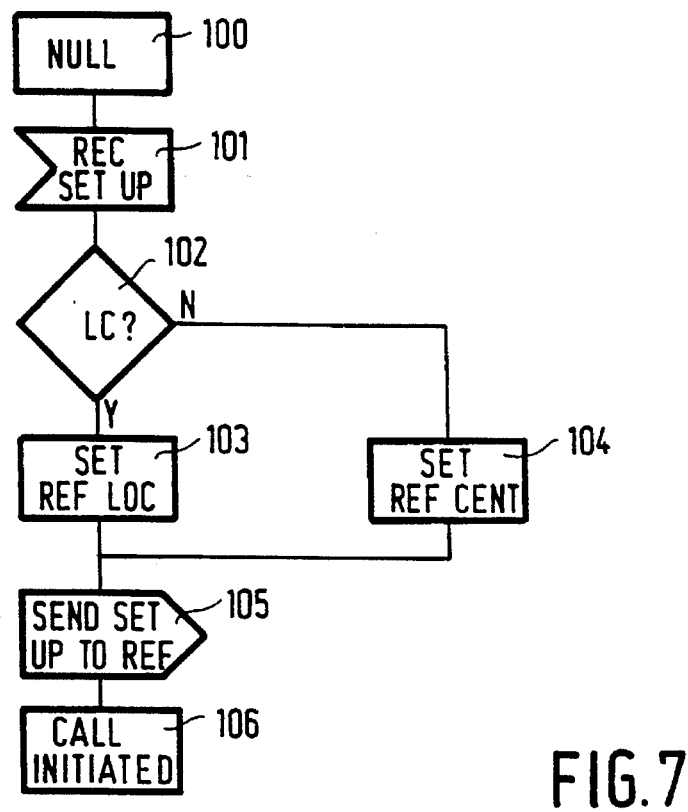
FIG. 7 represents a flow chart which shows how the routing means process a SET UP message.

FIG. 7 shows a flow chart that indicates how the routing means handle an incoming SET UP message. The depicted blocks have the following connotations:

| Block: | Inscription: | Connotation: |
|---|---|---|
| 100 | NULL | Initial state |
| 101 | REC SET UP | Reception of SET UP message |
| 102 | LC? | Is the indicator LC present in the SET UP message? Yes: go to block 103 No: go to block 104 |
| 103 | SET REF LOC | Set the reference for local communication |
| 104 | SET REF CENT | Set the reference for non-local communication |
| 105 | SEND SET UP TO REF | Send SET UP message to the central control unit or to the second process in dependence on the set reference |
| 106 | CALL INITIATED | Communication has been initiated. |

Figure 8:
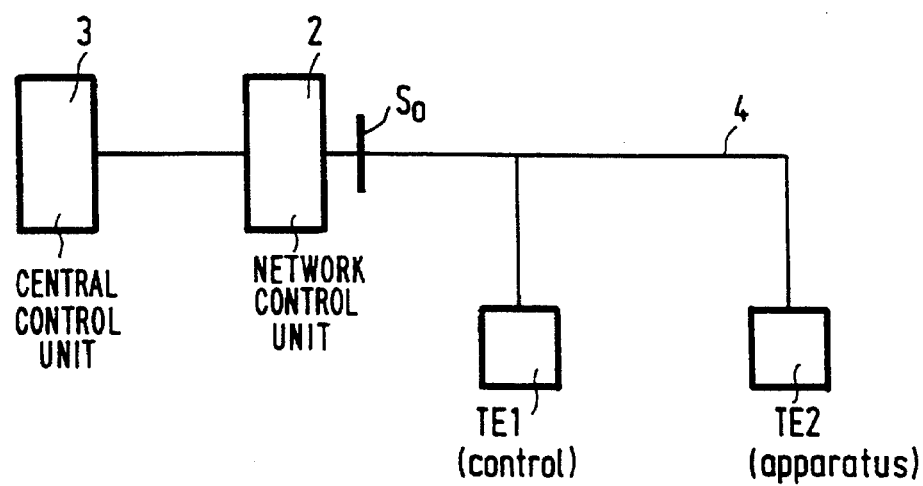
FIG. 8 shows a communication system according to the invention which is utilized for apparatus control.

FIG. 8 shows a communication system according to the invention which is used for apparatus control. Terminal TE2 is an apparatus controlled by terminal TE1. This apparatus may be, for example, a door light or an air conditioner. Terminal TE2 may be a standard ISDN terminal, but also a non-ISDN terminal coupled to a terminal adapter. The terminal adapter provides an adaptation of a non-ISDN terminal to the $S_O$ interface. By means of the controlling terminal TE1, it is possible to set terminal TE2 to a desired state. For this purpose, a local communication is set up between terminals TE1 and TE2.

I claim:

1. A communication system comprising:
a network terminal unit coupled via an interface to a bus for connecting terminals to said communication system said network terminal unit comprises routing means for transparently setting up a local communication between at least two terminals connected to the bus in response to a SET UP message sent over the bus, wherein for setting up the local communication, a calling terminal connected to the bus inserts an indicator in the SET UP message the indicator for indicating that a local communication between two terminals on the same bus is desired, and further wherein the SET UP message further comprises a unique call reference for the communication to be set up, whereupon in response to the indicator, the routing means sets up the local communication transparently to a called terminal connected to the bus.

2. The communication system as claimed in claim 1, wherein the routing means directs the SET UP message to a control channel on the bus.

3. The communication system as claimed in claim 2, wherein the routing means reroutes messages which are received via the control channel on the bus and which have a call reference equal to a call reference in the SET UP message, wherein the routing means reroutes the messages to the control channel on the bus.

4. Network terminal unit for use in a communication system, the communication system based upon an integrated services digital network (ISDN), said network terminal unit being coupled via an interface to a bus for connecting terminals to the communication system said network terminal (2) comprising:
routing means for transparently setting up a local communication between at least two terminals connected to the bus in response to a SET UP message sent over the bus, wherein a calling terminal connected to the bus inserts an indicator in the SET UP message, the indicator for indicating that a local communication between two terminals on the same bus is desired, and further wherein the SET UP message further comprises a unique call reference for the communication to be set up, whereupon in response to the indicator, said routing means sets up a local communication transparently to a called terminal connected to the bus.

5. A terminal suitable for connection via a bus to a communication system based upon an integrated services digital network (ISDN), said terminal is comprising means for inserting an indicator in a SET UP message, the indicator indicating that a local communication between two terminals on the same bus is desired, and further wherein the SET UP message further comprises a unique call reference for the communication to be set up, whereupon in response to the indicator, a routing means sets up a local communication transparently to a called terminal connected to the bus.

* * * * *